(12) United States Patent
Rivera

(10) Patent No.: US 12,321,411 B2
(45) Date of Patent: *Jun. 3, 2025

(54) LOADING ANIMATION WITH SHAPE THAT GROWS FROM WITHIN FROM CENTRAL POINT

(71) Applicant: Truist Bank, Charlotte, NC (US)

(72) Inventor: Reinaldo Rivera, Raleigh, NC (US)

(73) Assignee: Truist Bank, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/417,280

(22) Filed: Jan. 19, 2024

(65) Prior Publication Data

US 2024/0160686 A1    May 16, 2024

Related U.S. Application Data

(63) Continuation of application No. 17/568,459, filed on Jan. 4, 2022, now Pat. No. 11,914,668.

(51) Int. Cl.
*G06F 16/957* (2019.01)
*G06T 13/80* (2011.01)

(52) U.S. Cl.
CPC ......... *G06F 16/9577* (2019.01); *G06T 13/80* (2013.01)

(58) Field of Classification Search
None
See application file for complete search history.

(56) References Cited

U.S. PATENT DOCUMENTS

| | | | | |
|---|---|---|---|---|
| 7,593,015 B2* | 9/2009 | Rao | ..................... | G06F 16/9577 |
| | | | | 345/475 |
| 8,624,809 B2* | 1/2014 | Mahowald | ........... | G09G 3/3208 |
| | | | | 345/83 |
| 8,751,953 B2* | 6/2014 | Forstall | ............... | G06F 16/9577 |
| | | | | 715/781 |
| 9,977,566 B2* | 5/2018 | Jitkoff | ................... | G06T 11/001 |
| 10,318,095 B2* | 6/2019 | Harrison | ............... | G06F 40/143 |
| 10,558,323 B1* | 2/2020 | Von Dehsen | ........ | G05B 19/042 |
| D879,137 S * | 3/2020 | Mizono | ........................ | D14/489 |
| 2005/0289458 A1* | 12/2005 | Kylmanen | ............... | G06F 16/95 |
| | | | | 707/E17.107 |
| 2007/0124666 A1* | 5/2007 | Sauve | ................... | G06F 16/957 |
| | | | | 707/E17.119 |
| 2010/0118037 A1* | 5/2010 | Sheikh | .................... | G06T 13/80 |
| | | | | 345/473 |

(Continued)

*Primary Examiner* — Howard Cortes
(74) *Attorney, Agent, or Firm* — Kilpatrick Townsend & Stockton LLP; Michael A. Springs, Esq.

(57) ABSTRACT

A server can be configured for providing a loading animation with a shape that grows from within from a central point. The server can provide, in response to receiving a request to access a feature of a webpage that includes a first shape, a loading animation that includes a second shape. The loading animation can include an animation sequence that causes the second shape to grow in size, without changing shape, from within from a central point into a first area occupied by the second shape. Providing the loading animation can include (i) terminating the animation sequence in response to a predetermined amount of time elapsing and (ii) providing the loading animation for display on the entity device while the server accesses the feature of the webpage. The server can provide access to the feature.

20 Claims, 6 Drawing Sheets

(56) References Cited

U.S. PATENT DOCUMENTS

| | | | | |
|---|---|---|---|---|
| 2010/0313159 A1* | 12/2010 | Decker | ............ | H04L 67/02 |
| | | | | 715/772 |
| 2011/0285727 A1* | 11/2011 | Fernandez | ............ | G06T 13/20 |
| | | | | 345/473 |
| 2012/0096383 A1* | 4/2012 | Sakamoto | ............ | G06F 9/451 |
| | | | | 715/772 |
| 2013/0014013 A1* | 1/2013 | Aoki | ............ | G06F 16/957 |
| | | | | 715/783 |
| 2013/0239040 A1* | 9/2013 | Kaleta | ............ | G06F 3/0484 |
| | | | | 715/772 |
| 2014/0300610 A1* | 10/2014 | Mayhew | ............ | G06T 13/00 |
| | | | | 345/473 |
| 2014/0320507 A1* | 10/2014 | Myung | ............ | G06T 13/80 |
| | | | | 345/474 |
| 2015/0121257 A1* | 4/2015 | Kollencheri Puthenveettil | ............ | G06F 3/0488 |
| | | | | 715/760 |
| 2015/0193120 A1* | 7/2015 | Leventhal | ............ | G06F 3/04847 |
| | | | | 715/765 |
| 2015/0193388 A1* | 7/2015 | Cornet | ............ | G06F 40/154 |
| | | | | 715/837 |
| 2015/0370444 A1* | 12/2015 | Jitkoff | ............ | G06T 11/001 |
| | | | | 715/823 |
| 2017/0177170 A1* | 6/2017 | Ding | ............ | G06F 3/0485 |
| 2017/0177194 A1* | 6/2017 | Lyons | ............ | H04L 67/06 |
| 2017/0220237 A1* | 8/2017 | Jow | ............ | G06T 13/00 |
| 2017/0329464 A1* | 11/2017 | Hong | ............ | G06F 3/04817 |
| 2017/0359434 A1* | 12/2017 | Desjardins | ............ | G06F 16/9574 |
| 2018/0325441 A1* | 11/2018 | DeLuca | ............ | G06F 11/328 |
| 2019/0206102 A1* | 7/2019 | Dalonzo | ............ | G06F 3/0486 |
| 2020/0249802 A1* | 8/2020 | Boshoff | ............ | G06F 3/0485 |
| 2021/0089333 A1* | 3/2021 | Kodmad | ............ | G06T 13/80 |
| 2022/0237847 A1* | 7/2022 | Lemberg | ............ | G06T 13/80 |

* cited by examiner

LOADING ANIMATION WITH SHAPE THAT GROWS FROM WITHIN FROM CENTRAL POINT

CROSS-REFERENCE TO RELATED APPLICATIONS

This is a continuation of U.S. application Ser. No. 17/568,459, filed Jan. 4, 2022, entitled "LOADING ANIMATION WITH SHAPE THAT GROWS FROM WITHIN FROM CENTRAL POINT," the entirety of which is incorporated herein by reference for all purposes.

TECHNICAL FIELD

This disclosure generally relates to loading animations and, more specifically (but not by way of limitation) to a loading animation with a shape that grows from within from a central point.

BACKGROUND

An entity can access a webpage. The entity can include an individual such as a user of the webpage, a designer of the webpage, or other suitable entities associated with the webpage. Upon the entity accessing the webpage, or any component, function, feature, or sub-process thereof, the webpage may load content accessed by the entities. For example, the entity may navigate to a feature of the webpage that can display information relating to an account owned by or otherwise associated with the entity. The entity may transmit confidential information (e.g., account credentials) to a server for accessing the feature. The webpage may not instantaneously display the feature and may display the feature after a period of time used to load (e.g., after verifying the credentials, accessing the feature, etc.) the feature. In some examples, the entity may be less likely to use the webpage or any associated service provided by the webpage or provider of the webpage if other loading animations are used on the webpage. Additionally, the entity may believe that a data breach or other undesirable event is occurring if the webpage seems suspicious (e.g., by using the other loading animations) while loading the feature requested by the entity.

SUMMARY

In one example, a server can be configured for providing a loading animation with a shape that grows from within from a central point. The server can include a processing device and a non-transitory computer-readable medium that includes instructions that can be executed by the processing device to cause the server to perform various operations. The server can provide, to an entity device and in response to receiving a request to access a feature of a webpage that includes a first shape, a loading animation that includes a second shape corresponding to the first shape. The loading animation can include an animation sequence that causes the second shape to grow in size, without changing shape, from within from a central point into a first area occupied by the second shape. The first area can be different than a second area occupied by the first shape. Providing the loading animation can include (i) terminating the animation sequence in response to a predetermined amount of time elapsing and (ii) providing the loading animation for display on the entity device while the server accesses the feature of the webpage. The server can provide, to the entity device, access to the feature.

In another example, a method can be used to provide a loading animation with a shape that grows from within from a central point. The method can include providing, by a server, to an entity device, and in response to receiving a request to access a feature of a webpage that includes a first shape, a loading animation that includes a second shape corresponding to the first shape. The loading animation can include an animation sequence that causes the second shape to grow in size, without changing shape, from within from a central point into a first area occupied by the second shape. The first area can be different than a second area occupied by the first shape. Providing the loading animation can include (i) terminating the animation sequence in response to a predetermined amount of time elapsing and (ii) providing the loading animation for display on the entity device while the server accesses the feature of the webpage. The method can include providing, by the server and to the entity device, access to the feature.

In another example, a non-transitory computer-readable medium can include instructions that can be executed by a processing device for performing various operations for providing a loading animation with a shape that grows from within from a central point. The operations can include providing, to an entity device and in response to receiving a request to access a feature of a webpage that includes a first shape, a loading animation that includes a second shape corresponding to the first shape. The loading animation can include an animation sequence that causes the second shape to grow in size, without changing shape, from within from a central point into a first area occupied by the second shape, and the first area can be different than a second area occupied by the first shape. Providing the loading animation can include (i) terminating the animation sequence in response to a predetermined amount of time elapsing and (ii) providing the loading animation for display on the entity device while the feature of the webpage is being accessed. The operations can include providing, to the entity device, access to the feature.

DETAILED DESCRIPTION

Figure 1:
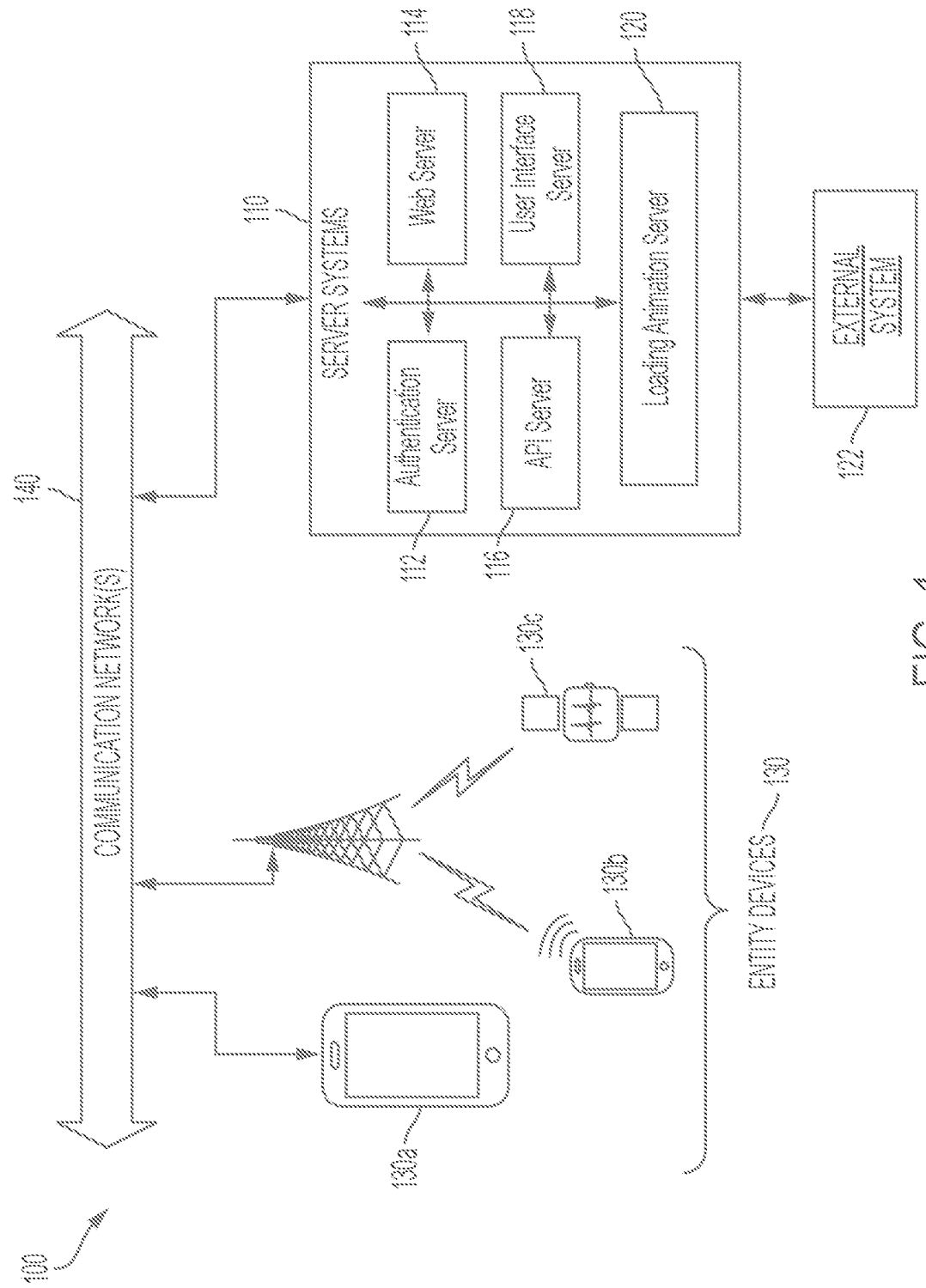
FIG. 1 is a schematic of a network environment in which a loading animation with a shape that grows from within from a central point can be provided according to one aspect of the present disclosure.

Certain aspects and features of the present disclosure relate to a loading animation having a first shape that grows from within to fill an area, the first shape being similar to a second shape included in a webpage. The entity can include an individual such as a user of the webpage, a provider of the webpage, or other suitable type of entity. The webpage can include a webpage displayed on an entity device and that provides various information, features, and other suitable functions for the entity. In some examples, the webpage can be provided to the entity or the entity device by a server, either directly or indirectly, and may include web-based or application-based resources. The information, features, and other suitable functions may include or otherwise involve accounts held by or otherwise associated with the entity. The loading animation may be provided by the server or other suitable computing device or system, for example, while the server accesses requested features (e.g., that are not immediately available to the server), validates account information (e.g., login credentials, etc.), and the like. The loading animation can grow from within from a centralized point into an area occupied by the first shape that can be similar or identical to the second shape. The first shape can include any suitable shape for use in a loading animation. For example, the first shape can include a regular shape such as quadrilateral (e.g., square, rectangle, rhombus, parallelogram, etc.), a triangle, a hexagon, or other suitable regular shape. In other examples, the first shape can include other, suitable, non-regular shapes (e.g., concave shapes, shapes that include trademarked logos, etc.), may include rounded edges, or may include other suitable features. The second shape can be included in the webpage. For example, the second shape can be displayed on a portion of the webpage, and the second shape may be used to display information (e.g., account information, messages from the server, etc.). The first shape can be similar, or may otherwise correspond, to the second shape. For example, the first shape can be or otherwise include a square, and the second shape can be or otherwise include a rectangle. In other examples, the first shape may be the same as, or otherwise congruent to, the second shape.

A webpage can be provided (e.g., output for display on an entity device) by a server. The server may include any suitable computing device, computing system, or computing network that can generate, output, or otherwise provide the webpage. For example, the server may include one or more computing devices operated by a financial institution, and the provided webpage may include a banking or investment webpage usable by an entity to make decisions about associated entity accounts. The entity may request access to one or more features, functionalities, and the like of the webpage. For example, the entity may access the webpage and then may request to view or otherwise interact with an entity account owned, operated, or otherwise associated with the entity.

To access the webpage, or the features or functionalities thereof, the server may request login credentials or other confidential information from the entity. The server may receive the confidential information from the entity (e.g., via the entity device or other suitable device) and may perform various tasks such as validating the confidential information, accessing the requested features or functionalities, or other suitable tasks. Performing the various tasks may not be instantaneous. For example, the server may take up to a few seconds, a few minutes, etc. to perform the various tasks or to otherwise access or load the requested features or functionalities. During this delay, data breaches can occur. For example, the entity may have been routed to a fake webpage that may receive the confidential information from the entity and may transmit the confidential information to a nefarious actor or perform other undesirable tasks with the confidential information. The fake webpage may display a different loading animation that may look or otherwise seem suspicious.

In some examples, the different loading animation may be similar or identical to a loading animation used by a legitimate webpage. But, upon the legitimate webpage displaying the different loading animation, the entity may view the different loading animation, may not trust the legitimate webpage, and may believe or suspect that the transmitted confidential information may be breached or otherwise mishandled by the legitimate webpage. This suspicion may cause the entity to not trust the legitimate webpage, and a lack of trust in the legitimate webpage may cause the entity to subsequently use the legitimate webpage, or any feature or functionality thereof, less or not at all.

A loading animation can be provided by a server to increase trust or perceived security in a webpage and for other suitable purposes. For example, the loading animation can include a first shape that is similar or identical to a second shape that is included in the webpage. The second shape may correspond to a commonly recognized or otherwise familiar shape (e.g., a brand, a trademark, etc.). Accordingly, the first shape may resemble, may be similar or identical to, or may otherwise correspond to the second shape. In examples involving branding, the first shape may correspond to or otherwise represent a brand (e.g., a trademarked image, a logo, etc.) and may increase an awareness of a correspondence of the brand to the webpage.

The loading animation can be provided (e.g., via an entity device) to the entity. For example, in response to the entity requesting access to a feature or a functionality of the webpage, the server may provide (e.g., for display) the loading animation to the entity, for example while the server validates the request and accesses the requested feature or functionality. The loading animation may be displayed on the webpage in various locations. For example, the loading animation can be displayed on the whole webpage (e.g., in response to requesting a sub-page of the webpage) or on a portion of the webpage (e.g., in response to requesting access to an entity account or other suitable feature). The loading animation can be displayed in other suitable locations or techniques with respect to the webpage.

The loading animation can include the first shape and can be animated in various sequences. The first shape can include a quadrilateral, a triangle, a hexagon, or other suitable regular or irregular shapes. The various sequences can include growing-from-within, rotating, sliding, flipping, or other suitable animation sequences for displaying the loading animation. The growing-from-within animation sequence may be selected by the server for any suitable purposes.

For examples with the growing-from-within loading animation sequence, the loading animation may start small at a central point and progressively increase to a full-size shape. For example, if the first shape is a rectangle, the loading animation may start with a blank screen or a tiny rectangle at the central point and may progressively increase the rectangle to a full-size rectangle centered around the central point. The loading animation may use different colors of the first shape in sequence. For example, the server may select a white rectangle, a purple rectangle, and a blue rectangle and may provide the growing-from-within loading animation sequence for the white rectangle, then the purple rectangle, then the blue rectangle, and then repeat. In some examples, the server may be configured to provide the loading animation sequence for a predetermined amount of time. The predetermined amount of time may be a few seconds and may be determined or selected to increase safety (e.g., reduce risk of epilepsy or other suitable disease associated with motion on a display) for the entity. Subsequent to the predetermined amount of time, the server may display the first shape in place of the loading animation.

FIG. 1 is a schematic of a network environment 100 in which a loading animation with a shape that grows from within into an area, the shape being similar to that of a webpage, can be provided according to one aspect of the present disclosure. The network environment 100 can include entity devices 130, one or more communication networks 140, and a server system 110. The entity devices 130 may request and access resources (e.g., web-based or application-based resources) within the server system 110 over one or more communications networks 140. The network environment 100 may correspond to a Wide Area Network ("WAN") environment, such as the Internet, through which the entity devices 130 may communicate with servers (e.g., the server system 110) via web browsers or client-side applications, to establish communication sessions, request and receive web-based resources, and access other suitable features of applications or services.

The server system 110 may be communicatively coupled to one or more external entities (e.g., external system 122), which may be associated with providing the loading animation, providing requested features or functionalities to the entity, or the like, through one or more networks. In other examples, the server system 110 can provide the loading animation to the entity device 130. The external system 122 may be or otherwise include financial account data systems that include account data associated with an entity (e.g., a user of an entity device 130). The server system 110 may be or include any type of server including, for example, a rack server, a tower server, a miniature server, a blade server, a mini rack server, a mobile server, an ultra-dense server, a super server, or the like. The server system 110 may include various hardware components such as, for example, a motherboard, processing units, memory systems, hard drives, network interfaces, power supplies, etc. The server system 110 may include one or more server farms, clusters, or any other appropriate arrangement or combination of computer servers. Additionally, the server system 110 may act according to stored instructions located in a memory subsystem of the server system 110 and may execute an operating system or other applications.

The server system 110 may implement several different applications and services, and perform additional server-side functionality, including by an authentication server 112, a web server 114, an API server 116, a user interface server 118, a loading animation server 120, or other suitable servers. For example, in implementations of banking or financial services systems, electronic commerce systems, and the like, the web-based resources (e.g., a webpage or any feature or functionality thereof) provided by web server 114 may be used by the entity devices 130 to access or request access to account information and perform various functions related to financial accounts. The API server 116 may be configured to make API calls to the external system 122 to request access to features associated with the entity. The user interface server 118 may be configured to provide a user interface to the entity devices 130 for receiving information (e.g., login credentials, or other confidential information) from the entity or for other suitable purposes. The loading animation server 120 may be configured to provide one or more implementations of the loading animation, for example, while the server system 110 accesses or requests access to features requested by the entity. The external system 122 may store information for the server system 110 to implement functions relating to account access, permissions, financial services, or the like. In some examples, the authentication server 112 can be used to validate data prior to (e.g., while providing the loading animation) accessing requested features.

The entity devices 130, which can include suitable user devices for accessing web-based resources or application-based resources, can be capable of accessing and establishing communication sessions with the server system 110 and, in some examples, the external system 122 through the communication networks 140. As illustrated in FIG. 1, entity devices 130a-130c correspond to mobile devices, including tablet computers 130a, smartphones 130b, and smart watches 130c, which may access the server system 110 via a Local Area Network (LAN) or Wide Area Network (WAN), as well as mobile telecommunication networks, short-range wireless networks, or various other communication network types (e.g., cable or satellite networks). Although certain examples herein are described in terms of entity devices 130, in other examples, the entity devices 130 may additionally or alternatively include other mobile or non-mobile computing devices capable of accessing the server system 110 via the communications network 140.

Although certain components are shown in FIG. 1, other suitable, compatible, network hardware components and network architecture designs may be implemented in various embodiments to support communication between the server system 110, the external system 122, and entity devices 130. Such communication networks may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the entity devices 130 and the server system 110 in FIG. 1 may be local area networks, such as one based on Ethernet, Token-Ring or the like. Such network(s) also may be wide-area networks, such as the Internet, or may include financial or banking networks, telecommunication networks such as a public switched telephone networks (PSTNs), cellular or other wireless networks, satellite networks, television or cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
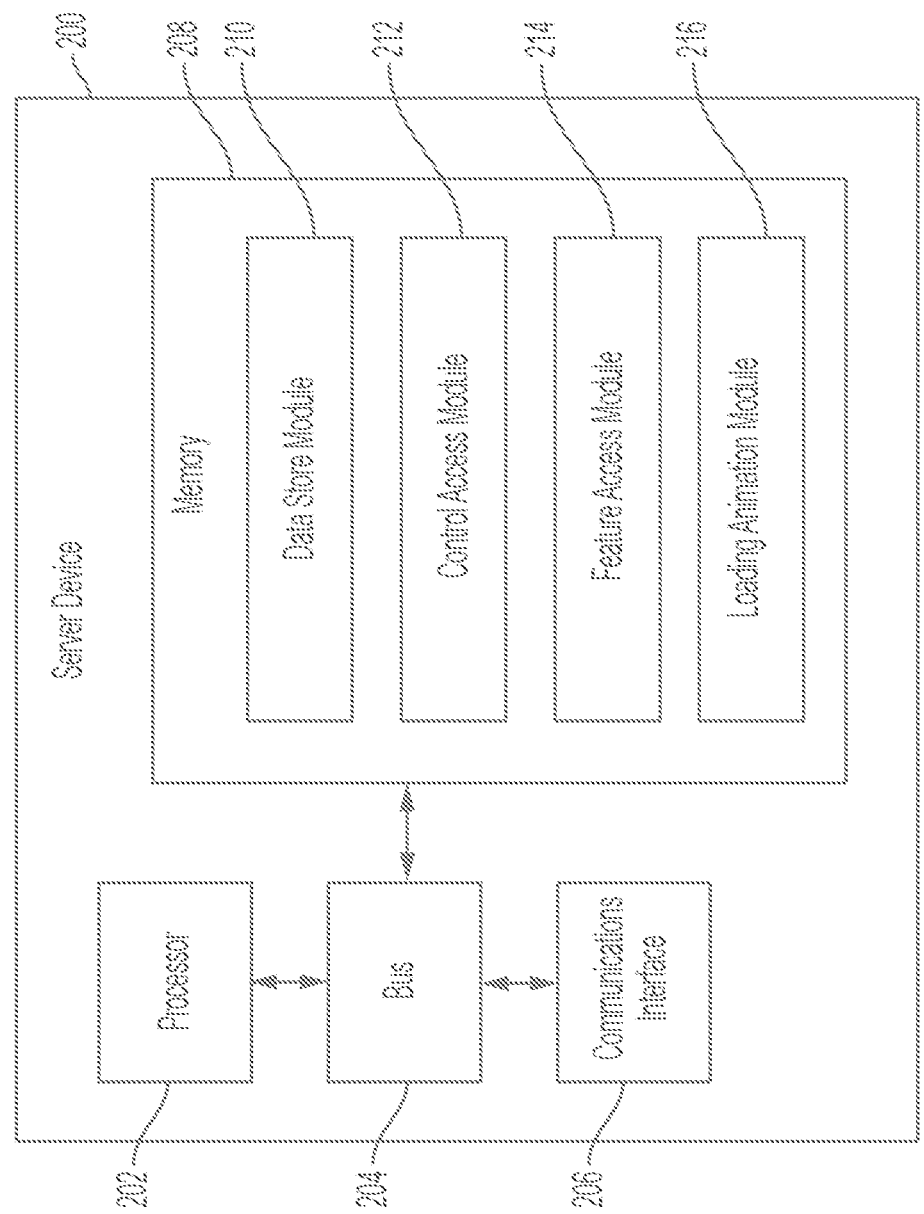
FIG. 2 is a block diagram of an example of a server device configured to provide a loading animation using a shape that grows from within from a central point according to one aspect of the present disclosure.

FIG. 2 is a block diagram of an example of a server device 200 configured to provide a loading animation using a shape that grows from within, into an area, in which the shape is similar to that of a displayed webpage according to one aspect of the present disclosure. The server device 200 may be a network device and may include a processor 202, a bus 204, a communications interface 206, and a memory 208. In some examples, the components shown in FIG. 2 may be integrated into a single structure. For example, the components can be within a single housing. In other examples, the components shown in FIG. 2 can be distributed (e.g., in separate housings) and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C #, etc.

The communications interface 206 may interface with other network devices or network-capable devices to analyze and receive information related to accessing functions of an application or for other suitable purposes or functionalities. Information received from the communications interface 206 may be sent to the memory 208, or to other suitable components of the server device 200, via the bus 204. The memory 208 can store any information received from the communications interface 206.

The memory 208 may include program code for providing a loading animation using a shape that grows from within into an area, which may be similar to a shape of a displayed webpage. The program code may cause the server device 200, or any component within the server device 200, to receive a request to access one or more features (e.g., web-based or application-based features) of a webpage. The program code can cause the server device 200 to transmit the loading animation to an entity device 130 while the server device 200 accesses the requested web-based or application-based features. The program code can additionally cause the server device 200 to provide access to the requested features.

The data store module 210 may store information relating to an entity account (e.g., username and password, security information, transactional data) for a number of entities and associated entity devices 130, including originating IP addresses of login attempts, browser settings of login attempts, etc. The control access module 212 may validate whether a request by an entity to access features of a webpage has been successfully authenticated after the entity has entered correct credentials. In some examples, the control access module 212 may additionally or alternatively determine requested features or functionalities based on the request received by the server device 200. In some examples, the control access module 212 can access or otherwise receive data from the entity (e.g., a user, etc.) indicating the request for accessing features of the webpage (e.g., accessing a confidential account, performing financial tasks, etc.). The feature access module 214 may access and provide features of the webpage. For example, the feature access module 214 may access an entity account and may provide the access to the entity account to the entity in response to validation performed by the control access module 212.

In some examples, in response to the server device 200 receiving the request to access features of the webpage and while the control access module 212, the feature access module 214, or a combination thereof perform respective tasks, the server device 200 may provide the loading animation to the entity. The respective tasks may include validating the request, accessing the features, other suitable tasks, or a combination thereof. The server device 200 may use the loading animation module 216 to provide the loading animation. For example, The loading animation module 216 may select the shape of the loading animation to match or otherwise be similar to a shape on the webpage. Additionally, the loading animation module 216 may select a color scheme and an animation sequence (e.g., growing-from-within) that may increase an amount of trust or perceived security in the webpage from the entity. The loading animation module 216 can perform other suitable tasks for providing (e.g., the entity device 130) the loading animation to the entity.

Figure 3:
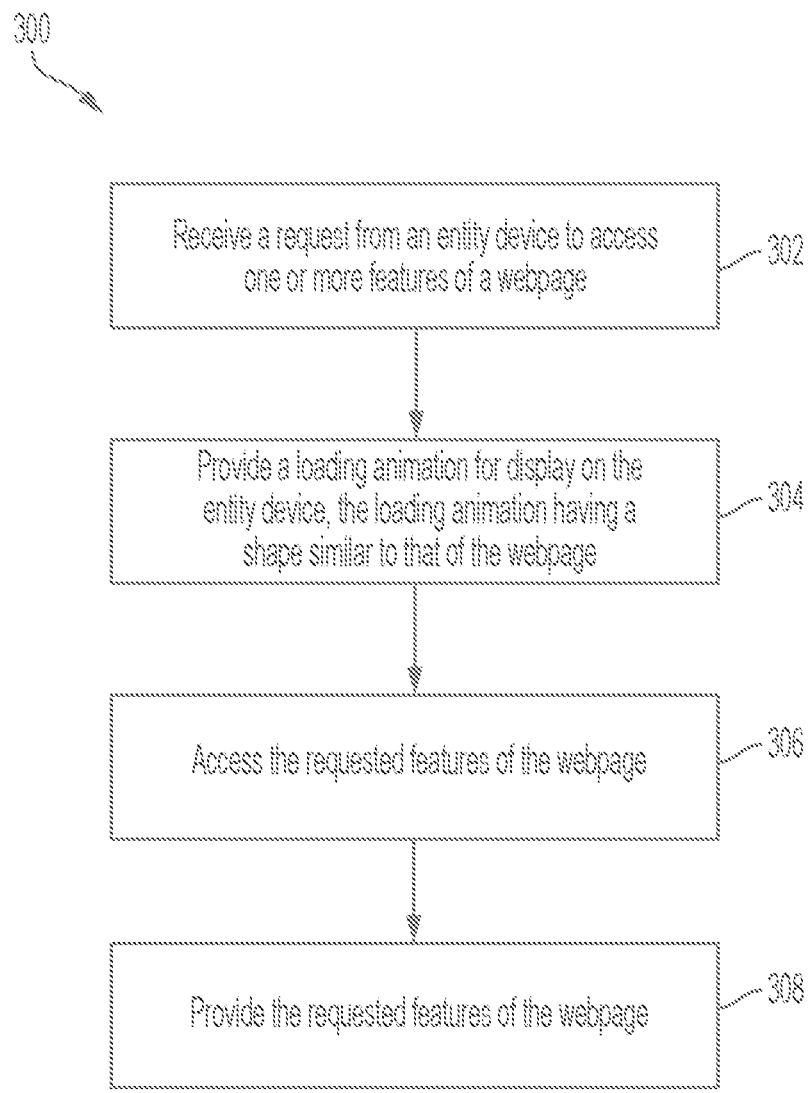
FIG. 3 is a flow chart of a process for providing a loading animation having a shape that grows from within from a central point according to one aspect of the present disclosure.

FIG. 3 is a flow chart of a process 300 for providing a loading animation having a shape that grows from within into an area, the shape being similar to that of a displayed webpage, according to one aspect of the present disclosure. At block 302, the server device 200 receives a request from an entity to access one or more features of a webpage. The request from the entity can include confidential information or other suitable information that may indicate that the entity may want to view or interact with the webpage or any feature or functionality thereof. For example, the entity may attempt to login to an entity account that may be included in or associated with the server device 200. In another example, the entity may have already logged into an entity account, and the request may include a request to transfer resources or perform other financial functions (e.g., bill pay, money transfers, loan applications etc.) via the webpage.

At block 304, the server device 200 provides the loading animation for display to the entity (e.g., on the entity device 130). In response to receiving the request, the server device 200 may provide the loading animation. The server device 200 may (e.g., via the loading animation module 216) select or otherwise determine a shape of the loading animation, a sequence of the loading animation, a color scheme of the loading animation, or other suitable parameters of the loading animation. The parameters of the loading animation may be selected by the server device 200 based on one or more shapes of the webpage. For example, if the webpage includes a rectangle or rectangle-like shape, the server device 200 may select a rectangle or similar shape for the loading animation.

At block 306, the server device 200 accesses the requested features of the webpage. In some examples, while the server device 200 (e.g., via the loading animation module 216) provides the loading animation for display to the entity, the server device 200 may simultaneously access the requested features or functionalities of the webpage. The server device 200 can use the feature access module 214 to access the features. For example, the feature access module 214 can access the features within the server device 200. In other examples, the feature access module 214 can make an API call to, for example, the external system 122 to request access to the requested features. The server device 200 can access the requested features or functionalities of the webpage via other suitable techniques.

At block 308, the server device 200 provides, to the entity, access to the requested features of the webpage. In response to accessing the requested features or functionalities of the webpage, the server device 200 may provide (e.g., via the entity device 130) access to the features to the entity. The server device 200 may terminate the loading animation upon accessing the features and then may provide the features to the entity. In other examples, the server device 200 may terminate the loading animation after a predetermined amount of time and provide a static loading image (e.g., the first shape). The server device 200 can additionally or alternatively provide access to the requested features or functionalities of the webpage using other suitable techniques.

Figure 4A:
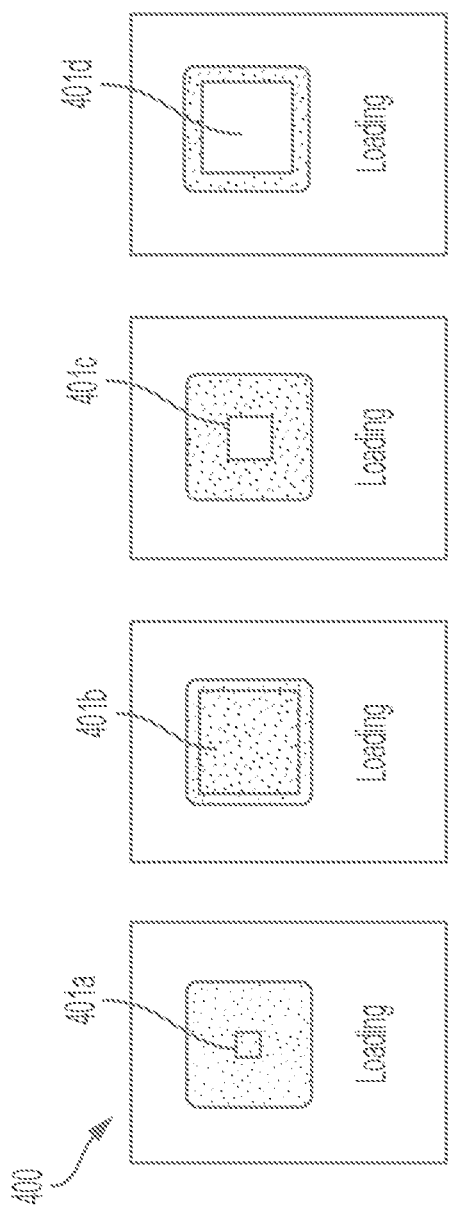
FIG. 4A is an example of a loading animation sequence according to one aspect of the present disclosure.

FIG. 4A is an example of a loading animation sequence 400 according to one aspect of the present disclosure. As illustrated, the loading animation sequence 400 includes four stages 401a-d, but the loading animation sequence 400 can include other suitable stages. In some examples, the server device 200 (e.g., via the loading animation module 216) can determine or otherwise select the loading animation sequence 400 and the shapes and color schemes thereof. While the loading animation sequence 400 is illustrated as including a square, the loading animation sequence 400 can include other suitable shapes that can grow from within from a central point to occupy an area. The loading animation sequence 400 can be displayed in any suitable location with respect to the webpage from which the entity is requesting access to features.

The loading animation sequence 400 can be provided by the server device 200 for output or display (e.g., on the entity device 130 or other suitable display device). The display device can display the loading animation sequence 400, for example, in order of the four stages 401a-d. For example, the display device can output the stage 401a, then the stage 401b, then the stage 401c, then the stage 401d, etc. In other examples, the display device can display the four stages 401a-d in a different order or may display other suitable stages (e.g., the loading animation sequence 400 may include any suitable amount of stages including less than four or greater than four) intermittently or in-between the four stages 401a-d. Subsequent to a predetermined amount of time, the display device may receive instructions from the server device 200 that may cause the display device to terminate the loading animation sequence 400 and to, instead, display a still image that may be similar or identical to one or more shapes included in the loading animation sequence 400.

Figure 4B:
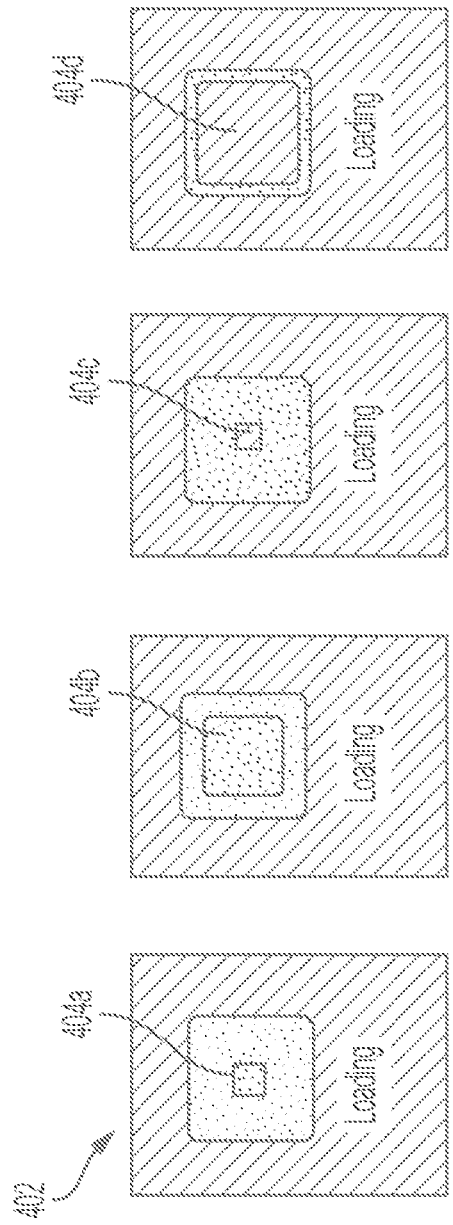
FIG. 4B is another example of a loading animation sequence according to one aspect of the present disclosure.

FIG. 4B is another example of a loading animation sequence 402 according to one aspect of the present disclosure. As illustrated, the loading animation sequence 402 includes four stages 404a-d, but the loading animation sequence 402 can include other suitable stages. In some examples, the server device 200 (e.g., via the loading animation module 216) can determine or otherwise select the loading animation sequence 402 and the shapes and color schemes thereof. While the loading animation sequence 402 is illustrated as including a square, the loading animation sequence 402 can include other suitable shapes that can grow from within from a central point to occupy an area. Additionally, as illustrated, the loading animation sequence 402 may be similar or identical to the loading animation sequence 400 but as a "night-mode" or other suitable themed version of the loading animation sequence 400. The loading animation sequence 400 can be displayed in any suitable location with respect to the webpage from which the entity is requesting access to features.

The loading animation sequence 402 can be provided by the server device 200 for output or display (e.g., on the entity device 130 or other suitable display device). The display device can display the loading animation sequence 402, for example, in order of the four stages 404a-d. For example, the display device can output the stage 404a, then the stage 404b, then the stage 404c, then the stage 404d, etc. In other examples, the display device can display the four stages 404a-d in a different order or may display other suitable stages (e.g., the loading animation sequence 402 may include any suitable amount of stages including less than four or greater than four) intermittently or in-between the four stages 404a-d. Subsequent to a predetermined amount of time, the display device may receive instructions from the server device 200 that may cause the display device to terminate the loading animation sequence 402 and to, instead, display a still image that may be similar or identical to one or more shapes included in the loading animation sequence 402.

Figure 5A:
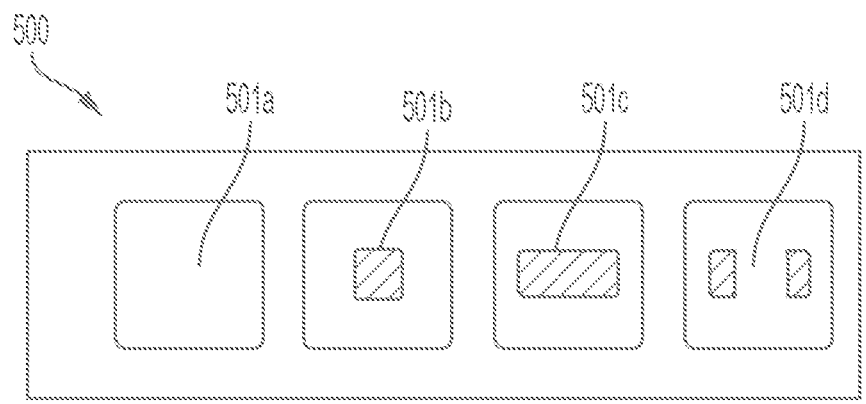
FIG. 5A is an example of a loading animation sequence for a webpage according to one aspect of the present disclosure.

FIG. 5A is an example of a loading animation sequence 500 for a webpage according to one aspect of the present disclosure. As illustrated, the loading animation sequence 500 includes four stages 501a-d, but the loading animation sequence 500 can include other suitable stages. The loading animation sequence 500 may be or otherwise include a shape that expands outward from within from a central point and then expands horizontally outward to reveal a second shape (e.g., a logo of a brand or other suitable shapes). The loading animation sequence 500 can include other suitable sequences or animations. The loading animation sequence 500 can be displayed in any suitable location on the webpage. For example, the loading animation sequence 500 can be displayed on the whole webpage or a portion thereof (e.g., on a button of the webpage, on a section of the webpage, etc.).

The loading animation sequence 500 can be provided by the server device 200 for output or display (e.g., on the entity device 130 or other suitable display device). The display device can display the loading animation sequence 500, for example, in order of the four stages 501a-d. For example, the display device can output the stage 501a, then the stage 501b, then the stage 501c, then the stage 501d, etc. In other examples, the display device can display the four stages 501a-d in a different order or may display other suitable stages (e.g., the loading animation sequence 500 may include any suitable amount of stages including less than four or greater than four) intermittently or in-between the four stages 501a-d. Subsequent to a predetermined amount of time, the display device may receive instructions from the server device 200 that may cause the display device to terminate the loading animation sequence 500 and to, instead, display a still image that may be similar or identical to one or more shapes included in the loading animation sequence 500.

Figure 5B:
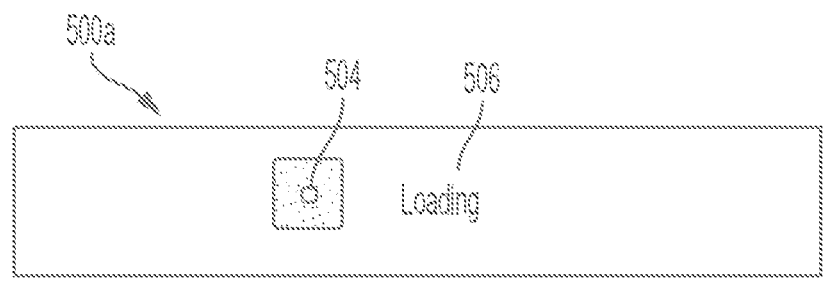
FIG. 5B is a set of loading animation examples for components of a webpage according to one aspect of the present disclosure.
Figure 5B:
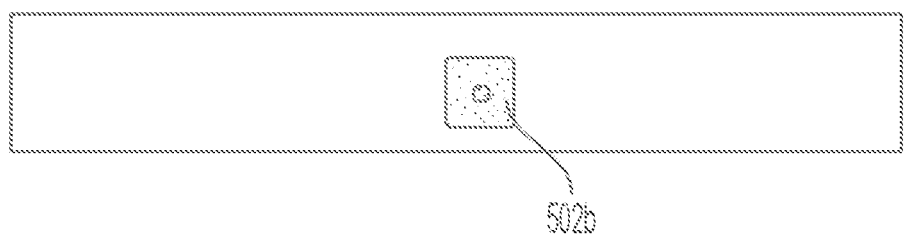

FIG. 5B is a set of loading animation examples 502a-b for components of a webpage according to one aspect of the present disclosure. The loading animation examples 502a-b may be displayable in a component or a subcomponent of a webpage (e.g., in-line loading of a portion of the webpage). The loading animation examples 502a-b can be used in other suitable locations and for other suitable purposes with respect to the webpage. Additionally, the loading animation examples 502a-b may similar or identical to one of the loading animation sequences 400, 402, or 500.

The loading animation examples 502a-b can be provided by the server device 200 for output or display (e.g., on the entity device 130 or other suitable display device). The display device can display the loading animation examples 502a-b on a portion (e.g., when loading an account or other suitable information displayable on a subset of the webpage) of the webpage. The display device can display the loading animation examples 502a-b, for example, in an order of stages of the loading animation examples 502a-b. For example, the display device can output the loading animation examples 502a-b in a similar fashion compared to the loading animation sequences 400, 402, or 500. Subsequent to a predetermined amount of time, the display device may receive instructions from the server device 200 and may terminate the loading animation examples 502a-b and may, instead, display a still image that may be similar or identical to one or more shape included in the loading animation examples 502a-b.

The loading animation example 502a may be displayable on the webpage for loading one or more components of the webpage. For example, the server device 200 may transmit a command that causes the display device to display the loading animation example 502a in a first portion of the webpage while loading account information associated with the entity. While displaying the loading animation example 502a, the display device may display other information (e.g., relating to other accounts, functionalities, etc.) on the webpage. The loading animation example 502a may include a shape 504 and a message 506. The shape 504 may include a shape similar to a different shape included in the webpage. The shapes 504 can include other suitable shapes for displaying the loading animation example 502a. The message 506 can convey that information is loading or is currently being accessed. For example, as illustrated, the message 506 includes "Loading . . ." The message 506 can include other suitable messages for conveying that the requested feature is loading or is currently being accessed.

Figure 6:
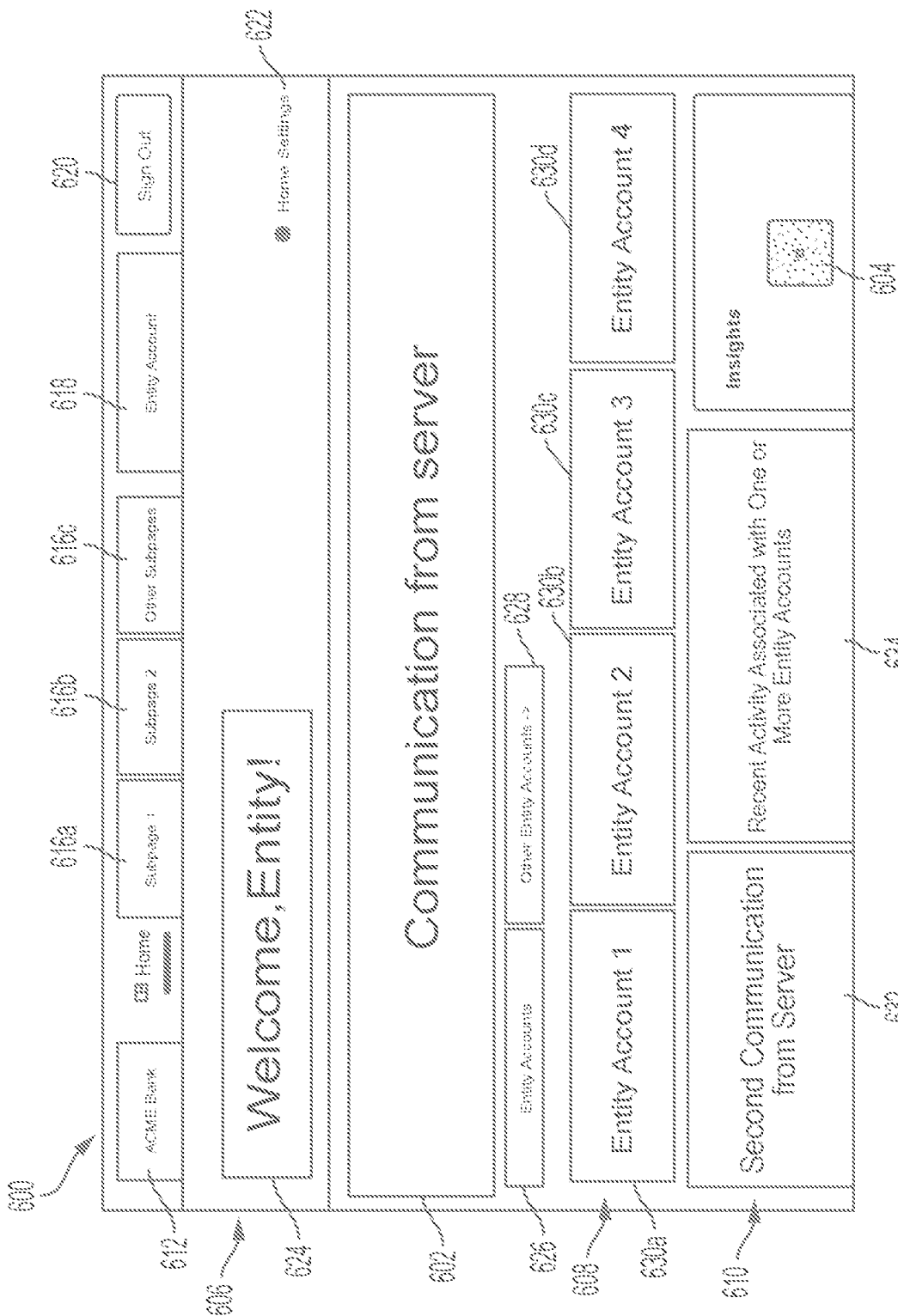
FIG. 6 is an example of a displayed webpage having a component with a shape similar to that of a loading animation of the displayed webpage according to one aspect of the present disclosure.

FIG. 6 is an example of a displayed webpage 600 having a component 602 with a shape similar to that of a loading animation 604 of the displayed webpage 600 according to one aspect of the present disclosure. The displayed webpage 600 can include the component 602, the loading animation 604, a top portion 606, an account section 608, and a bottom portion 610. The displayed webpage 600 can include other suitable components. In some examples, the displayed webpage 600 can be provided by the server device 200, the external system 122, other suitable computing devices or systems, or a combination thereof.

The top portion 606 can include a list of functions, resources, features, or other suitable objects with which an entity can interact. For example, as illustrated, the top portion 606 includes a logo 612, a home button 614, three subpage buttons 616a-c, an account button 618, a sign-out button 620, a settings button 622, and a welcome message 624. The top portion 606 can include other suitable interactive buttons, static components, message, or a combination thereof. The logo 612 can correspond to a logo of the provider of the displayed webpage 600. The home button 614 can be an interactive button that, when selected, may request and provide access to a home page of the displayed webpage 600. The subpage buttons 616a-c may be interactive buttons that, when selected, may request and provide access to one or more subpages of the displayed webpage 600. The account button 618 can be an interactive button that, when selected, may request and provide access to an account page associated with an entity account. The sign-out button 620 can be an interactive button that, when selected, can request the server device 200 sign the entity out of an accessed entity account. The settings button 622 can be an interactive button that, when selected, may request and provide access to settings associated with the entity account. The welcome message 624 can include a non-interactive, static or dynamic component of the displayed webpage 600 that can indicate successful access to an entity account and may indicate an owner or operator of the entity account. The components of the top portion 606 can include other suitable interactive or non-interactive components and may perform other suitable functions.

The account section 608 can include an account identifier 626, an entity accounts button 628, and a set of entity accounts 630a-d. The account section 608 may include other suitable interactive or non-interactive components for display on the account section 608 of the displayed webpage 600 and that can perform any suitable task or function with respect to the displayed webpage 600. The account identifier 626 may include information that indicates a type of account or types of accounts displayed in the account section 608. The entity accounts button 628 may be an interactive button that, when selected, may request and provide access to other entity accounts associated with the entity. The entity accounts 630a-d may include interactive or non-interactive components that can display information (e.g., balances, transfers, history, etc.) relating to the respective entity account 630.

The bottom portion 610 can include a second communication 632 from the server device 200, recent activity 634, the loading animation 604, or other suitable components displayable on the displayed webpage 600 and that can perform any suitable task or function with respect to the displayed webpage 600. The second communication 632 can be an interactive or non-interactive component that can display a message (e.g., a notification, an advertisement, etc.), for example, from the provider of the displayed webpage 600. The recent activity 634 may be an interactive or non-interactive component that can display information relating to recent activity with respect to one or more of the entity accounts 630a-d or to other suitable entity accounts.

The component 602 can be a communication from the server device 200, a display of entity account information, or other suitable component or suitable portion of the displayed webpage 600. As illustrated, the component 602 is a communication (e.g., an internal advertisement, a notification, an account reminder, etc.) from a server. The server can include the server device 200 and may be or otherwise include a server that provides the displayed webpage 600. The component 602 may include or otherwise be a first shape. For example, as illustrated, the shape of the component 602 is rectangular. The shape of the loading animation 604 is illustrated as a square, which is similar to the rectangular shape of the component 602. The loading animation 604 is illustrated as being displayed in a portion of the displayed webpage 600, but the loading animation 604 can be displayed in other locations, including as-a-whole, with respect to the displayed webpage 600.

In some examples, the entity can interact with one or more of the components of the displayed webpage 600. For example, the entity can interact with the subpage button 616a, the other entity accounts button 628, or other suitable components of the displayed webpage 600. Subsequent to the entity interacting with the subpage button 616a, the server device 200 may provide the loading animation 604 to the display device to be displayed in a full-screen configuration on the display device. For example, the display device may remove all components from the displayed webpage 600 and may display the loading animation 604 while the server device 200 accesses the subpage associated with the subpage button 616a. In another example, subsequent to the entity interacting with the other entity accounts button 628, the server device 200 may provide the loading animation 604 to the display device to be displayed on a portion of the displayed webpage 600. For example, the display device may remove the entity accounts 630a-d (but retain other components of the displayed webpage 600) and display, instead of the entity accounts 630a-d, the loading animation 604.

The loading animation 604 shown in FIG. 6 is just one example of a design that functions to convey that a feature is being accessed via a webpage (e.g., the displayed webpage 600) by being similar at least in shape to a component of the webpage. Other designs (e.g. designs using other shapes, shadings, proportions, loading animations, etc.) could be utilized to accomplish the same or similar functions.

The foregoing description of the examples, including illustrated examples, of the subject matter has been presented only for the purpose of illustration and description and is not intended to be exhaustive or to limit the subject matter to the precise forms disclosed. Numerous modifications, adaptations, combinations, and uses thereof can be apparent to those skilled in the art without departing from the scope of the subject matter.

What is claimed is:

1. A server comprising:
   a processing device; and
   a non-transitory computer-readable medium comprising instructions that are executable by the processing device to cause the server to perform operations, the operations comprising:
   providing, to an entity device and in response to receiving a request to access a feature of a webpage that includes a first shape, a loading animation that includes a second shape corresponding to the first shape, the loading animation including an animation sequence that causes the second shape to grow in size, without changing shape, from within from a central point into a first area occupied by the second shape, wherein the first area is different than a second area occupied by the first shape, and wherein providing the loading animation includes:
   terminating the animation sequence in response to a predetermined amount of time elapsing;
   providing the loading animation for display on the entity device while the server accesses the feature of the webpage; and
   providing a static loading image that includes the second shape that corresponds to the first shape; and
   providing, to the entity device, access to the feature.

2. The server of claim 1, wherein the operation of providing the loading animation comprises:
   providing the loading animation having the animation sequence for a predetermined amount of time; and
   in response to the predetermined amount of time elapsing and terminating the animation sequence, providing the static loading image.

3. The server of claim 1, wherein the webpage further includes a first color scheme, and wherein the operation of providing the loading animation includes providing the loading animation having a second color scheme corresponding to the first color scheme.

4. The server of claim 1, wherein the operations further comprise:
   receiving, from the entity device, the request to access the feature of the webpage; and
   accessing the feature of the webpage.

5. The server of claim 1, wherein the operation of providing the loading animation includes providing the loading animation for conveying secure transfer of information with respect to the webpage.

6. The server of claim 1, wherein the operation of providing the loading animation includes providing the loading animation to the entity device for display in a full-screen configuration on the entity device, and wherein the full-screen configuration of the loading animation corresponds to a feature type associated with the feature.

7. The server of claim 1, wherein the operation of providing the loading animation includes providing the loading animation to the entity device for display on a portion of the webpage such that the loading animation corresponds to a feature type associated with the feature.

8. A method comprising:
   providing, by a server, to an entity device, and in response to receiving a request to access a feature of a webpage that includes a first shape, a loading animation that includes a second shape corresponding to the first shape, the loading animation including an animation sequence that causes the second shape to grow in size, without changing shape, from within from a central point into a first area occupied by the second shape, wherein the first area is different than a second area occupied by the first shape, and wherein providing the loading animation includes:
   terminating the animation sequence in response to a predetermined amount of time elapsing;
   providing the loading animation for display on the entity device while the server accesses the feature of the webpage;
   providing a static loading image that includes the second shape that corresponds to the first shape; and
   providing, by the server and to the entity device, access to the feature.

9. The method of claim 8, wherein providing the loading animation comprises:
   providing the loading animation having the animation sequence for a predetermined amount of time; and
   in response to the predetermined amount of time elapsing and terminating the animation sequence, providing the static loading image.

10. The method of claim 8, wherein the webpage further includes a first color scheme, and wherein providing the loading animation includes providing the loading animation having a second color scheme corresponding to the first color scheme.

11. The method of claim 8, wherein the predetermined amount of time is a first amount of time determined prior to receiving the request.

12. The method of claim 8, wherein providing the loading animation includes providing the loading animation for conveying secure transfer of information with respect to the webpage.

13. The method of claim 8, wherein providing the loading animation includes providing the loading animation to the entity device for display in a full-screen configuration on the entity device, and wherein the full-screen configuration of the loading animation corresponds to a feature type associated with the feature.

14. The method of claim 8, wherein providing the loading animation includes providing the loading animation to the entity device for display a portion of the webpage such that the loading animation corresponds to a feature type associated with the feature.

15. A non-transitory computer-readable medium comprising instructions that are executable by a processing device for performing operations, the operations comprising:
providing, to an entity device and in response to receiving a request to access a feature of a webpage that includes a first shape, a loading animation that includes a second shape corresponding to the first shape, the loading animation including an animation sequence that causes the second shape to grow in size, without changing shape, from within from a central point into a first area occupied by the second shape, wherein the first area is different than a second area occupied by the first shape, and wherein providing the loading animation includes:
terminating the animation sequence in response to a predetermined amount of time elapsing;
providing the loading animation for display on the entity device while the feature of the webpage is being accessed;
providing a static loading image that includes the second shape that corresponds to the first shape; and
providing, to the entity device, access to the feature.

16. The non-transitory computer-readable medium of claim 15, wherein the operation of providing the loading animation comprises:
providing the loading animation having the animation sequence for a predetermined amount of time; and
in response to the predetermined amount of time elapsing and terminating the animation sequence, providing the static loading image.

17. The non-transitory computer-readable medium of claim 15, wherein the webpage further includes a first color scheme, and wherein the operation of providing the loading animation includes providing the loading animation having a second color scheme corresponding to the first color scheme.

18. The non-transitory computer-readable medium of claim 15, wherein the operation of providing the loading animation includes providing the loading animation for conveying secure transfer of information with respect to the webpage.

19. The non-transitory computer-readable medium of claim 15, wherein the operation of providing the loading animation includes providing the loading animation to the entity device for display in a full-screen configuration on the entity device, and wherein the full-screen configuration of the loading animation corresponds to a feature type associated with the feature.

20. The non-transitory computer-readable medium of claim 15, wherein the operation of providing the loading animation includes providing, to the entity device, the loading animation that includes the second shape that is geometrically similar to the first shape.

* * * * *